United States Patent [19]

Tsukawaki

[11] Patent Number: 5,008,948

[45] Date of Patent: Apr. 16, 1991

[54] SYSTEM FOR RECOGNIZING HANDWRITTEN LETTERS

[75] Inventor: Tomohiro Tsukawaki, Iwatsuki, Japan

[73] Assignee: Fuji Xerox Co., Ltd., Saitama, Japan

[21] Appl. No.: 173,617

[22] Filed: Mar. 25, 1988

[30] Foreign Application Priority Data

Jun. 15, 1987 [JP] Japan .............................. 62-148651

[51] Int. Cl.⁵ ............................................. G06K 9/00
[52] U.S. Cl. ......................................... 382/13; 382/3; 382/56
[58] Field of Search .................... 382/13, 3, 56, 41, 49

[56] References Cited

U.S. PATENT DOCUMENTS

| | | | |
|---|---|---|---|
| 3,718,908 | 2/1973 | Bloomstein | 382/3 |
| 4,020,463 | 4/1977 | Himmel | 382/3 |
| 4,364,024 | 12/1982 | Paetsch | 382/3 |
| 4,736,445 | 4/1988 | Gundersen | 382/13 |
| 4,752,965 | 6/1988 | Dunkley et al. | 382/3 |
| 4,809,195 | 2/1989 | Bechet | 382/3 |

Primary Examiner—David K. Moore
Assistant Examiner—Joseph Mancuso

[57] ABSTRACT

A handwritten letter recognition system comprises a reading unit and a recognition unit which are connected to a local area network. In the reading unit, a handwritten letter is read by a reading section to change the read handwritten letter into handwritten letter information, and the information is compressed by a compressing/expanding section and transmitted to the recognition unit via an interface through a transmission path. In the recognition unit, the transmitted information is expanded by a compressing/expanding section and recognized by a recognition section, and the recognition result is compressed by a compressing/expanding section in response to a request for transmission sent from one of terminal units provided on the local area network including the reading unit and sent through the transmission path to the terminal unit which sent the transmission request.

8 Claims, 2 Drawing Sheets

SYSTEM FOR RECOGNIZING HANDWRITTEN LETTERS

BACKGROUND OF THE INVENTION

This invention relates to a system for recognizing handwritten letters suited for applying to a local area network.

A conventional handwritten letter recognition device adapted to read and recognize handwritten letters comprises a reading unit for optically reading handwritten letters and a recognition unit for recognizing the handwritten letters read by the reading unit. The conventional handwritten letter recognition device includes one recognition unit dedicated to one reading unit in the recognition device, and is operated independently from other recognition units.

Recently, the advent of the local area network system which is intended for the effective utilization of common resources in a local area makes it desirable that the handwritten letter recognition device is connected to the local area network as one of the terminal hardware so that other terminal hardware provided on the network may utilize the result of the recognition made by the recognition device. Further, it is desired that a plurality of reading units are connected to the network so as to share one recognition unit provided on the network.

However, when the conventional recognition device of the above-described type is connected to the local area network, a large amount of time is required for the transmission of information supplied from the recognition device through the transmission path of the network. For this reason, working efficiency of the network is so low that the device of this type cannot be applied in a practical manner.

SUMMARY OF THE INVENTION

An object of this invention is to provide a handwritten letter recognition system capable of transmitting at a high speed the reading and recognition results from the handwritten letter reading and recognition units to other terminal units provided on a local area network.

Another object of this invention is provide a handwritten letter recognition system capable of effectively utilizing the transmission path of the network.

Further object of this invention is to provide a handwritten letter recognition system in which a plurality of reading units are connected to a local area network so as to share one recognition unit provided on the network.

A still further object of this invention is to provide a handwritten letter recognition system capable of compressing and transmitting the information concerning reading and recognition results of the handwritten letter.

According to this invention, there is provided a handwritten letter recognition system including a plurality of reading units which share a single handwritten letter recognitionon unit. Each of the reading units includes an interface circuit and is connected with the recognition unit via the interface circuit through a coaxial cable. When one of the reading units reads a handwritten letter to change the handwritten letter in the form of information or data, the reading unit compresses the information at its interface circuit and transmits the compressed information via the interface circuit and the coaxial cable to the handwritten letter recognition unit. The recognition unit expands the compressed information prior to recognition operations. When the recognition unit completes the recognition operation, it compresses the recognized information in accordance with a request for transmission sent from one of other terminal units including the reading unit connected with the coaxial cable of the network and transmits the compressed information via the interface circuit and the coaxial cable to the terminal unit. The interface circuit of the reading unit performs an expanding operation when it receives the compressed information from the recognition unit.

DESCRIPTION OF PREFERRED EMBODIMENTS

Figure 1:
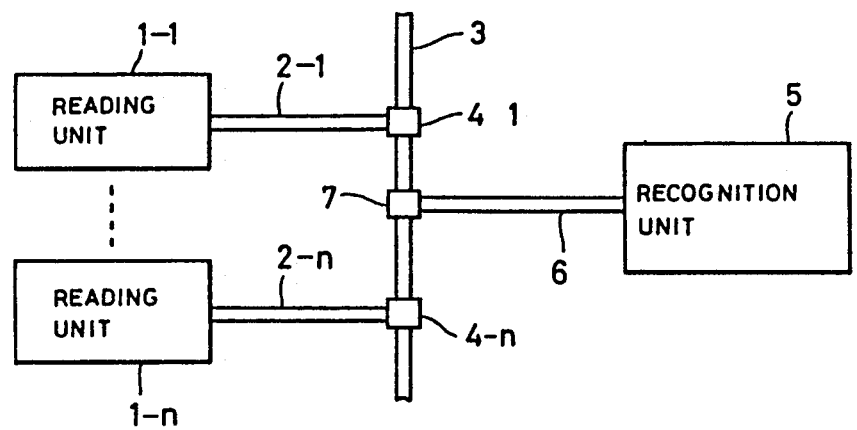
FIG. 1 is a diagram showing the configuration of an embodiment of a handwritten letter recognition system according to this invention.

Referring to FIG. 1, an embodiment of a handwritten letter recognition system comprises n handwritten letter reading units 1-1 to 1-n of the same configuration for optically reading a handwritten letter are connected respectively via transceiver cables 2-1 to 2-n to transceivers 4-1 to 4-n provided on a coaxial cable 3 forming a bus type network system. A recognition unit 5 is connected via a transceiver cable 6 and a transceiver 7 to the coaxial cable 5. The recognition unit 5 receives the reading results supplied from the n handwritten letter reading units 1-1 to 1-n in a time sharing manner so as to recognize the handwritten letter based on the reading results. Further, terminal units 8-1 to 8-m are connected respectively via transceiver cables 9-1 to 9-m to transceivers 10-1 to 10-m provided on the coaxial cable 3. The terminal units 8-1 to 8-m receive recognition result information of desired handwritten letters from the recognition unit 5. The letters m and n represent respectively the terminal unit and the recognition unit.

Figure 2:
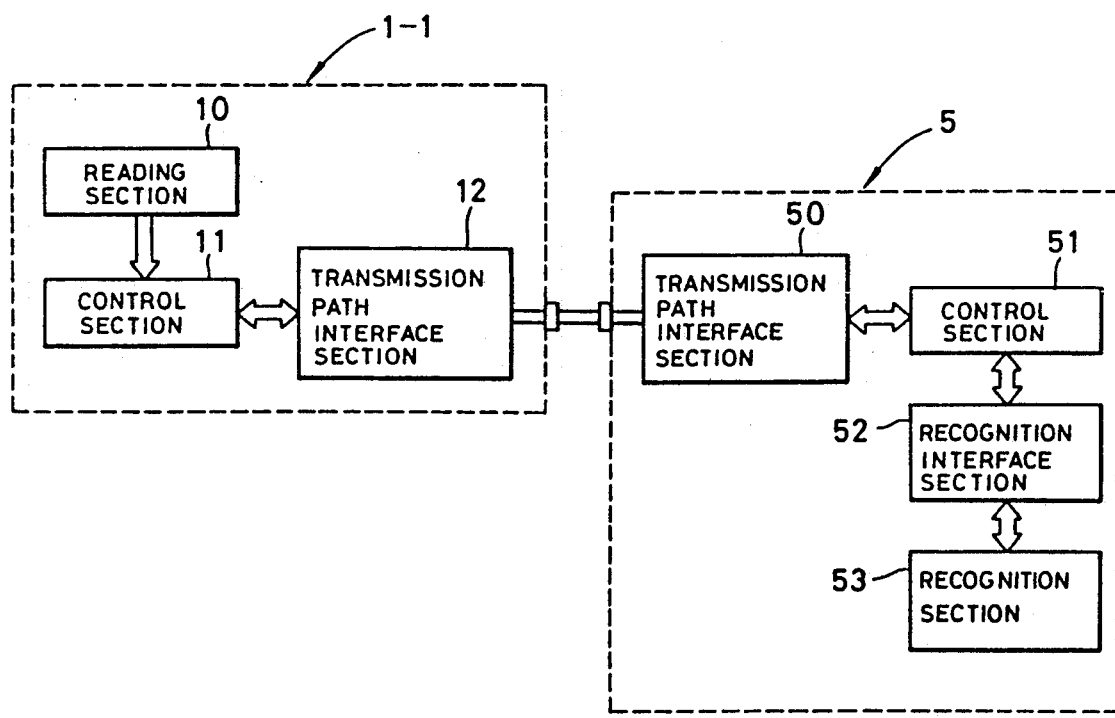
FIG. 2 is a block diagram showing a reading unit and a recognition unit of the handwritten letter recognition system according to this invention.

FIG. 2 is a block diagram showing the reading unit 1-1, one of the reading units 1-1 to 1-n shown in FIG. 1, and the recognition unit 5.

The reading unit 1-1 comprises a reading section 10 for optically reading handwritten letters, a control section 11 for controlling information of the handwritten letters read by the reading section 10 and for transmitting the reading result information to a transmission path interface section 12 to be described next, and a transmission path interface section 12 for compressing the reading result information supplied from the control section 11 and for transmitting the compressed information to the transceiver cable 2-1 (FIG. 1).

The recognition unit 5 comprises a transmission path interface section 50 for expanding the reading result information supplied from the reading unit 1-11 and for compressing recognition result information returned from a recognition section 53 to be described later so as to transmit the compressed information to the transceiver cable 6 (FIG. 1), a control section 51 for controlling the reading result information transmitted from the transmission path interface section 50 and for controlling the recognition result information returned from the recognition section 53 via a recognition interface section 52, the recognition interface section 50 for passing reading and recognition result information supplied from the control section 51 and the recognition section 53, and the recognition section 53 for recognizing handwritten letters based on the reading result information expanded at the transmission path interface section 50 and for transmitting recognizing result information via the recognition interface section 52 to the control section 51.

Figure 3:
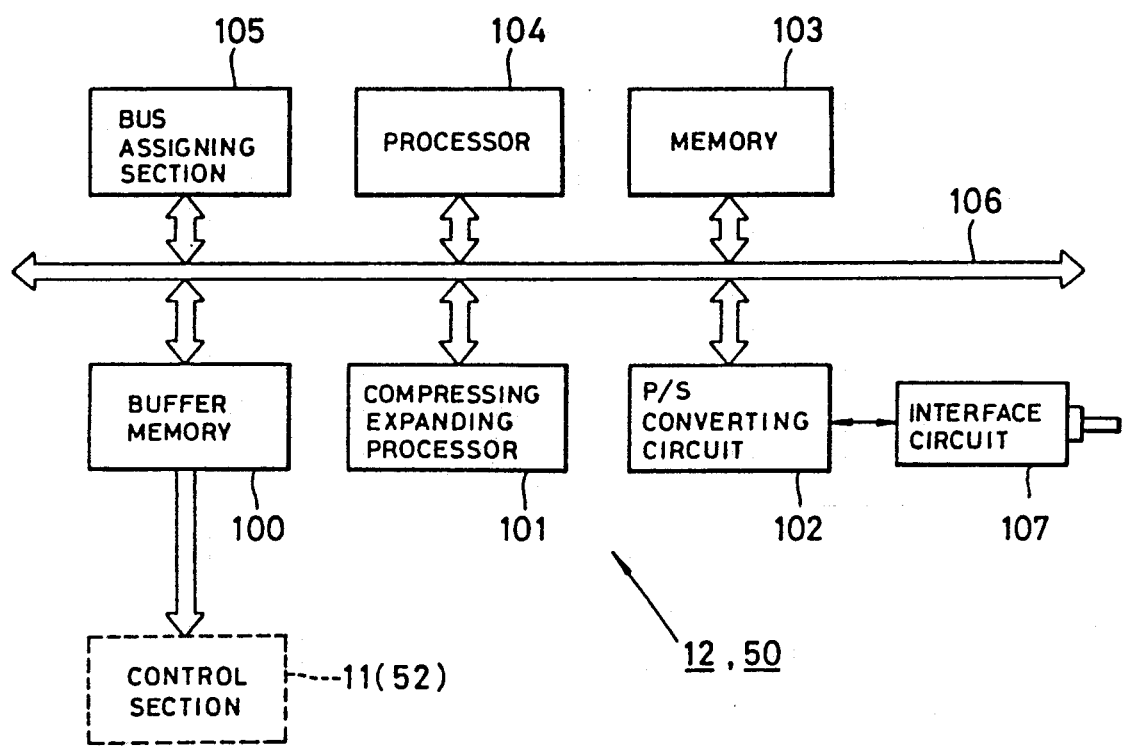
FIG. 3 is a block diagram showing a transmission path interface section.

Referring to FIG. 3, the transmission path interface sections 12 and 50, each comprising a buffer memory 100 for storing the reading result information of the handwritten letters, a compressing/expanding processor 101 for executing a compressing or expanding operation of the reading result information, a P/S converting circuit 102 for executing parallel-to-serial signal conversion and serial-to-parallel signal conversion with respect to the reading result information and the recognition result infromation, a memory 103 for storing the recognition result information, a processor 104 for controlling operations of every element in the transmission path interface sections 12 and 50, a bus assigning section 106 for giving either one of the compressing/expanding processor 101 and the processor 104 right of occupying a bus line 106, the bus assigning section being provided due to the fact that the compressing/expanding processor 101 and the processor 104 share the buffer memory 100 and the memory 103, a bus line 106 for connecting the above elements, and an interface and an interface a circuit 107 for respectively connecting the transceiver cable 2-1 and 6 with the transmission path interface sections 12 and 50.

With the above configuration, a handwritten letter is optically read by the reading section 10 of the reading unit 1-1, and thereafter information on the reading result is transmitted to the transmission path interface section 12 under the control of the control section 11. The transmitted reading result information of the handwritten letter is stored in the buffer memory 100 under the control of the processor 104 of the transmission path interface section 12. After reading result information is stored in the buffer memory 100, the processor 104 sends a command of compression to the compressing/expanding processor 101 to cause the processor 101 to compress the reading result information. And thereafter the compressed reading result information is stored again in the buffer memory 100. When the compressing operation is terminated, the compressing/expanding processor 101 sends a compressing operation termination signal to the processor 104. When the processor 104 receives the compressing operation termination signal, the processor 104 reads out the compressed reading result information stored in the buffer memory 100, sequentially transmits the read-out reading result information to the P/S converting circuit 102 to convert the transmitted Information into serial signals. The serial signals are in turn transmitted via the interface circuit 107 to the transceiver cable 2-1.

When the transmission path interface section 50 of the recognition unit 5 receives the compressed reading result information transmitted from the reading unit 1-1 via the transceiver 4-1, the coaxial cable 3, the transceiver 7 and the transceiver cable 6, the transmission path interface section 50 inputs the compressed reading result information via the interface circuit 107 to the P/S converting circuit 102 so as to convert the inputted compressed reading result information in the form of parallel signals. The converted reading result information is sequentially stored into the buffer memory 100 under the control of the processor 104. When a series of compressed reading result information is stored in the buffer memory 100, the processor 104 transmits an expanding operation command to a compressing/expanding processor 101 to cause the processor 101 to expand the compressed reading result information and the buffer memory 100 to store the expanded reading result information again. When the processor 104 receives an expanding process terminating signal informing termination of expanding process transmitted from the compressing/expanding processor 101, the expanded reading result information stored in the buffer memory is sequentially read out to be transmitted to a control section 51. The control section 51 controls such that the inputted reading result information is transmitted via a recognition interface section 52 to a recognition section 53. The recognition section 53 recognizes a handwritten letter based on the inputted reading result information and transmits the recognition result information via the recognition interface section 52 and control section 51 to the transmission path interface section 50. When the processor 104 of the transmission path interface section 50 receives information on the recognition result, the processor 104 causes the memory 103 to store the recognition result information.

In this state, when a request for transmission of a recognition result is sent from another terminal unit (FIG. 1) connected to the reading unit 1-1 or to the coaxial cable 3, the processor 104 of the transmission path interface section 50 of the recognition unit 5 sends an expanding process command to the compressing/expanding processor 101 to cause the processor 101 to expand information on recognition result stored in the memory 103. Thereafter, the processor 104 causes the P/S converting circuit 102 to convert the recognition result information into serial signals, the converted recognition result information is transmitted from the interface circuit 107 via the transceiver cable 6, the transceiver 7 and the coaxial cable 3 to the terminal unit requesting a transmission of the recognition result.

In the handwritten recognition system according to this invention, the reading result of the recognition result of a handwritten letter is first compressed and thereafter transmitted to the coaxial cable serving as a transmission cable of the network, thereby utilizing the network in an effective manner.

Further, in the handwritten letter recognition system according to this invention, since compressed recognition result information of handwritten letters is temporarily stored in a memory, the recognition result information can be transmitted to a terminal unit in the network in accordance with the transmission request sent from the terminal unit, whereby the transmission path of the network is utilized effectively.

Still further, in the handwritten letter recognition system according to this invention, since reading result and recognition result of handwritten letters are transmitted and received after they are compressed or expanded, time required for transmission is greatly reduced, whereby the recognition result is transmitted at a high speed to one of terminal units including the reading unit by which the handwritten letters are read. Accordingly, where this system is used in a local area network, significant advantageous effects can be obtained.

This invention can be embodied in various forms as long as the embodiment does not deviate from the spirit or the main features of the invention. Thus, the foregoing embodiment is, in any respect, merely an example of the various forms of embodiments, therefore it should not be considered as a limitation. The scope of this invention is not restricted by the description of the specification but defined by the claims. Further, any modification and alternation equivalent to the claims is within the scope of this invention.

What is claimed is:

1. A system for recognizing handwritten letters comprising:
    a central recognition means;
    a plurality of terminal units, each including a transmission request section for making a transmission request for handwritten letter information, a first compressing/expanding means for expanding compressed information received and for compressing information for transmitting, and a first interface means for transmitting and receiving information; each of said terminal units being separate from said recognition means;
    a plurality of reading means each including a reading section for reading the handwritten letter and converting said handwritten letter to computer readable data, a second compressing/expanding means for compressing the read-out handwritten letter data and for expanding the information when compressed information is received and a second interface means for transmitting information including the handwritten letter data; said reading means being separate from said recognition means and each of said terminal units;
    said central recognition means including a third compressing/expanding means for expanding the compressed handwritten letter data when the compressed handwritten letter data is transmitted from said reading means and for compressing the data when the data is received, said recognition means recognizing information from the expanded handwritten letter data, and a third interface means for compressing and transmitting said recognized information in accordance with said transmission request from said terminal unit; and
    a transmission path for connecting said terminal units, said reading means, and said recognition means; whereby said computer readable handwritten letter data is compressed by said second compressing/expanding means and transmitted to said recognition unit where it is expanded by said third compressing/expanding means and then recognized by said recognition means and compressed by said third compressing/expanding means in response to a transmission request from a selected one of said terminal units; said compressed data being transmitted to said selected terminal unit where it is expanded by said first expanding/compressing means and viewed.

2. The system according to claim 1, wherein said reading section comprises an optical reader for optically reading the handwritten letter.

3. The system according to claim 1, wherein said interface of said recognition means compresses the recognized letter information in accordance with the transmission request from said transmission request section of said terminal units, and for transmitting the compressed letter information to the transmission request section.

4. The system according to claim 1, wherein said interface is connected with said transmission path via a transceiver.

5. The system according to claim 1, wherein said interface adjusts the form and generating speed of the handwritten letter data when said reading means transmits the handwritten letter data.

6. The system according to claim 1, wherein said recognition means comprises a first memory section for storing the handwritten letter data compressed by and transmitted from said reading means while storing the handwritten letter data expanded by said second compressing/expanding section and a second memory section for storing the letter information recognized in said recognition section.

7. The system according to claim 1, wherein said transmission path is a coaxial cable configured in the form of a bus-type network.

8. The system according to claim 1, wherein each said reading means, said terminal units and said recognition means execute data transmission in a time sharing manner.

* * * * *